March 28, 1967  A. GLANC  3,311,817
A.C. CAPACITIVE VOLTAGE STABILIZER
Filed Dec. 9, 1963

INVENTOR.
ANTONIN GLANC
BY
Attorney

United States Patent Office 3,311,817
Patented Mar. 28, 1967

3,311,817
A.C. CAPACITIVE VOLTAGE STABILIZER
Antonín Glanc, Libochovice, Czechoslovakia, assignor to Ceskoslovenska Akademie ved, Prague, Czechoslovakia, a corporation of Czechoslovakia
Filed Dec. 9, 1963, Ser. No. 328,871
Claims priority, application Czechoslovakia, Dec. 19, 1962, 7,137/62
3 Claims. (Cl. 323—93)

The invention relates to an A.C. capacitive voltage stabilizer and more particularly to a voltage stabilizer of said type which makes use of the anisotropy of the crystalline phase of some dielectrics, particularly of ferroelectric materials.

It is an object of the invention to provide a novel A.C. voltage stabilizer using a variable capacitive voltage divider which is simple and effective.

It has already been proposed to design dielectric voltage stabilizers as capacitive voltage dividers in which at least one of the capacities or part thereof is provided by a capacitor having a dielectric of variable permittivity.

If according to this invention suitable dielectrics are used, it is possible to create an element with a single dielectric which may be used directly in the circuit arrangement of a voltage stabilizer.

Briefly stated, the device for stabilization of an electric A.C. voltage in accordance with the invention makes use of the principle of a capacitive voltage divider including a capacitive element having variable dielectric properties and, is characterized by the fact that a body of ferroelectric dielectric is provided with at least two pairs of electrodes of which at least one pair is arranged in the direction of the ferroelectric axis of the dielectric, and the remaining pair or pairs are arranged at right angles to the said direction of the ferroelectric axis of the dielectric, the capacitors formed by the various pairs of electrodes being connected as a capacitive voltage divider.

Figure 1:
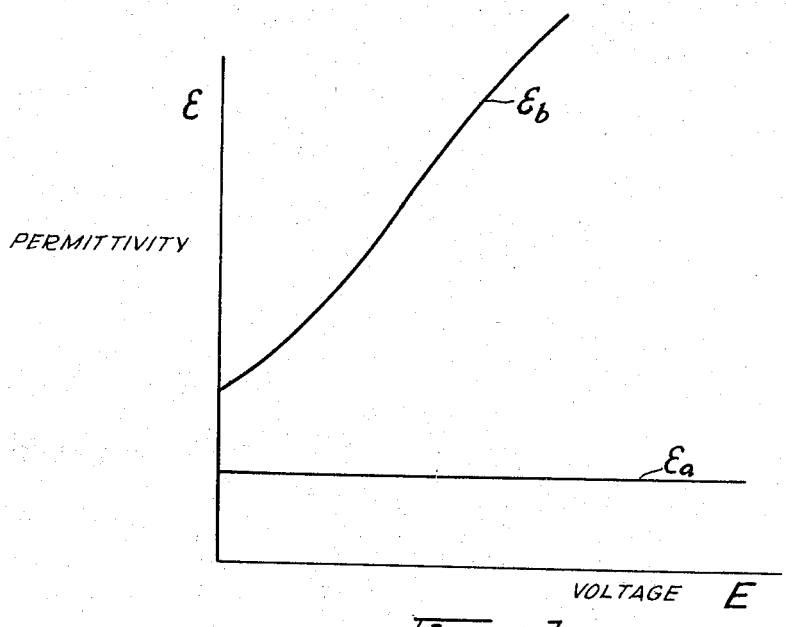

The invention will be best understood from the following specification to be read in conjunction with the accompanying drawings in which FIG. 1 illustrates the characteristic curves of the real components of the permittivity in dependence upon the applied voltage E that is in dependence upon the electric fields of the capacitors. The line $\epsilon_a$ represents the real component of permittivity in the direction perpendicular to the ferroelectric axis and the line $\epsilon_b$ in the direction of the ferroelectric axis.

Figure 2:
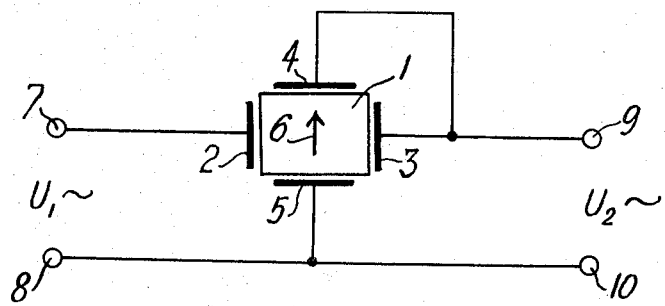

FIG. 2 is a schematic section through a stabilization element in accordance with the invention.

A ferroelectric dielectric, for example triglycine sulphate (TGS) has different properties in different directions of the monocrystal. TGS crystallizes at room temperature in the monoclinic system of the sphenoidal department $2(C_2{}^2-P2_1)$. It is an anisotropic dielectric which belongs into the group of ferroelectrically uniaxial crystals, that is to say it has a single distinguished direction in which spontaneous polarization of this dielectric occurs.

In the direction of the ferroelectric axis it behaves as a ferroelectric crystal with a variable relationship between the dielectric constant and the electric field. The dielectric properties are substantially constant in the direction at right angles to the ferroelectric axis.

FIG. 2 shows a piece of a ferroelectric monocrystal 1, for example TGS which is cut at right angles to the ferroelectric axis 6 (Y-cut) and is provided with plates or electrodes 2, 3 and 4, 5 which form capacitors $C_1$ and $C_2$ respectively, with fields standing to each other at right angles. One of these fields has the direction of the ferroelectric axis 6 of the monocrystal 1 namely the direction in which the monocrystal 1 shows variable dielectric properties as a function of the electric field, while in the direction perpendicular to said axis 6 the dielectric properties are substantially constant. The two capacitors $C_1$ and $C_2$ are connected in a voltage divider arrangement by jointly connecting the electrodes 3 and 4, to point 9 of the outlet terminal and each electrode 2 and 5 to one point 7 and 8 of the input terminal for the alternating voltage $U_1$. The stabilized output voltage $U_2$ is drawn from the outlet points 9 and 10 of the capacitor $C_2$ formed by the electrodes 4 and 5.

In case the input voltage $U_1$ increases, such a voltage increase manifests itself across the electrodes 2 and 5 of capacitors $C_1$ and $C_2$ respectively, which are connected in a voltage division manner. If the permittivity of both capacitors $C_1$ and $C_2$ remained constant, the voltage $U_1$ would divide between the capacitors at a ratio reciprocal to the capacitance of both capacitors, i.e. at a ratio proportional to their reactance. However, the real component of the permittivity of capacitor $C_2$ varies with variations of the electric field, as shown in FIGURE 1. As the real component of permittivity increases with increasing voltage, the capacitance of capacitor $C_2$ equally increases and the reactance of this capacitor decreases. Because the voltage $U_1$ supplied to both capacitors $C_1$ and $C_2$ divides at the ratio of the actual reactances of both capacitors, the ratio of voltages divided between the capacitors $C_1$ and $C_2$ increases. In other words, the voltage across the capacitor $C_2$ becomes relatively lower than in the case in which a capacitor having a constant permittivity was utilized. The capacitors $C_1$ and $C_2$ connected in this manner therefore act as a voltage divider which divides the input voltage in a variable ratio inversely dependent upon the magnitude of the input voltage. The circuit therefore acts for instance as a voltage surge limiter, maintaining at the output terminals a voltage substantially below a voltage which would be present in case the permittivity of both capacitors $C_1$ and $C_2$ remained constant.

If the input voltage decreases, the opposite occurs.
Similar stabilization takes place when the input points 7, 8 and the output points 9, 10 are interchanged.

It should be obvious to those expert in the art that the described and illustrated example does not exhaust the full scope of the invention and its practical application.

What I claim is:

1. An A.C. capacitive voltage stabilizer comprising a single piece of a ferroelectric dielectric having a variable real component of its permittivity in the direction of its ferroelectric axis and a substantially constant real component of its permittivity in a direction perpendicular to said ferroelectric axis; a first pair of electrodes oppositely disposed adjacent said dielectric to form a first capacitor and a second pair of electrodes oppositely disposed adjacent said dielectric to form a second capacitor, the electrodes of said first pair being arranged along the direction of the ferroelectric axis and electrodes of said second pair being arranged along a direction perpendicular to the direction of the ferroelectric axis; a pair of input terminals each connected to one electrode of each of said capacitors for receiving A.C. voltage, the A.C. voltage being divided across said capacitors inversely according to the permittivity thereof; and a pair of output terminals, one of said output terminals being connected to one electrode of one of said capacitances, another of said output terminals being connected to an electrode of each of said capacitances for providing a stabilized output A.C. voltage.

2. An A.C. capacitive voltage stabilizer according to claim 1 wherein one electrode of said second capacitor is connected to a terminal of both said input and output terminals.

3. An A.C. capacitive voltage stabilizer according to claim 1 wherein one electrode of the second capacitor is connected to a terminal of both said input and output terminals, the other electrode of said second capacitor and one electrode of said first capacitor are connected to another terminal of said output terminals, and the other electrode of said first capacitor is connected to the other terminal of said input terminals.

References Cited by the Examiner

UNITED STATES PATENTS

| | | | |
|---|---|---|---|
| 1,907,427 | 5/1953 | Marrison | 310—9.5 X |
| 3,032,706 | 5/1962 | Wieder | 310—9.8 X |
| 3,054,942 | 9/1962 | Searcy et al. | 323—93 X |
| 3,213,207 | 10/1965 | Munk | 310—9.5 X |

OTHER REFERENCES

Jona and Shirane: Ferroelectric Crystals, MacMillan, N.Y., 1962, QD 931J6C.3, pages 10–15.

JOHN F. COUCH, *Primary Examiner.*

A. D. PELLINEN, *Assistant Examiner.*